US008712191B2

(12) United States Patent
Bernard

(10) Patent No.: US 8,712,191 B2
(45) Date of Patent: Apr. 29, 2014

(54) METHOD FOR DETECTING DIRECTIONS OF REGULARITY IN A TWO-DIMENSIONAL IMAGE

(75) Inventor: Christophe Bernard, Paris (FR)

(73) Assignee: Zoran (France) S.A., Neuilly-sur-Seine (FR)

( * ) Notice: Subject to any disclaimer, the term of this patent is extended or adjusted under 35 U.S.C. 154(b) by 0 days.

(21) Appl. No.: 13/696,034

(22) PCT Filed: Mar. 9, 2011

(86) PCT No.: PCT/EP2011/053510
§ 371 (c)(1),
(2), (4) Date: Nov. 2, 2012

(87) PCT Pub. No.: WO2011/141197
PCT Pub. Date: Nov. 17, 2011

(65) Prior Publication Data
US 2013/0051703 A1 Feb. 28, 2013

Related U.S. Application Data

(60) Provisional application No. 61/333,401, filed on May 11, 2010.

(51) Int. Cl.
*G06K 9/32* (2006.01)
(52) U.S. Cl.
USPC ........................................................ 382/300
(58) Field of Classification Search
USPC .......... 382/300; 348/443, 445, 451, 452, 458; 358/525; 708/290
See application file for complete search history.

(56) References Cited

U.S. PATENT DOCUMENTS

| 5,991,463 | A | * | 11/1999 | Greggain et al. | ............. 382/298 |
| 6,614,484 | B1 | | 9/2003 | Lim et al. | |
| 2001/0008425 | A1 | * | 7/2001 | Shin et al. | ...................... 348/452 |
| 2002/0057362 | A1 | | 5/2002 | Wredenhagen et al. | |

(Continued)

FOREIGN PATENT DOCUMENTS

| EP | 0746157 B1 | 8/2004 |
| EP | 1748386 A1 | 1/2007 |

(Continued)

OTHER PUBLICATIONS

"An Edge Preserving Locally Adaptive Anti-aliasing Zooming Algorithm with Diffused Interpolation" by Munib Arshad Chughtai, dated 2006, pp. 1-8.

(Continued)

*Primary Examiner* — Yubin Hung
(74) *Attorney, Agent, or Firm* — Lando & Anastasi, LLP

(57) ABSTRACT

When analyzing an image signal having pixel values defined on a sampling grid, the method detects at least one direction of regularity of the image signal in relation to a pixel of the sampling grid. This detection comprises computing a respective loss value associated with at least one direction in a set of directions, and selecting at least one direction of regularity by minimizing the loss value. The loss value associated with a direction (u, v), where u is a horizontal coordinate and v a vertical coordinate, has an axial loss component measuring variations of the pixel values in at least one linear array of pixels. This linear array is a horizontal array if |u/v|>1 and a vertical array if |u/v|<1.

10 Claims, 6 Drawing Sheets

(56) References Cited

U.S. PATENT DOCUMENTS

| | | |
|---|---|---|
| 2002/0097911 A1* | 7/2002 | L. de Queiroz .............. 382/195 |
| 2002/0126900 A1* | 9/2002 | Kim .............. 382/199 |
| 2005/0036062 A1* | 2/2005 | Kang et al. .............. 348/448 |
| 2006/0033936 A1 | 2/2006 | Lee et al. |
| 2007/0200950 A1 | 8/2007 | Bae |
| 2007/0269113 A1* | 11/2007 | Chao .............. 382/199 |
| 2009/0028464 A1 | 1/2009 | Pan et al. |
| 2009/0079855 A1* | 3/2009 | Ito et al. .............. 348/265 |
| 2009/0147109 A1* | 6/2009 | Muresan .............. 348/253 |
| 2010/0157147 A1* | 6/2010 | Bellers .............. 348/448 |
| 2010/0201868 A1* | 8/2010 | Che et al. .............. 348/448 |
| 2011/0310974 A1 | 12/2011 | Shand |
| 2013/0050272 A1 | 2/2013 | Bernard |

FOREIGN PATENT DOCUMENTS

| | | |
|---|---|---|
| EP | 1947603 A2 | 7/2008 |
| KR | 20050023983 A | 3/2005 |
| WO | 9919834 A1 | 4/1999 |
| WO | 2007115583 A1 | 10/2007 |
| WO | 2011141196 A1 | 11/2011 |

OTHER PUBLICATIONS

International Search Report and Written Opinion of the International Searching Authority from PCT/EP2011/053510, dated May 24, 2011.

* cited by examiner

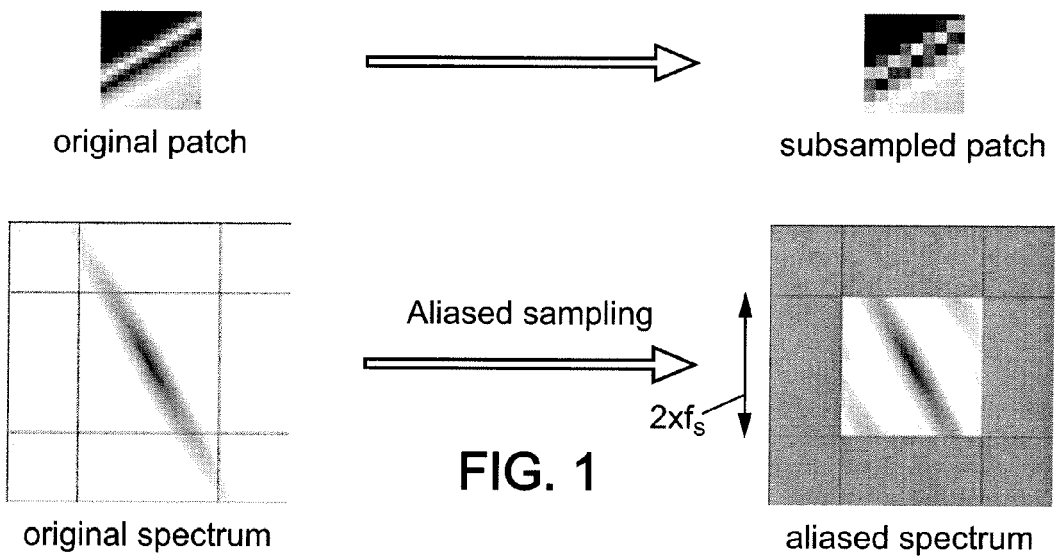
original patch → subsampled patch
original spectrum —Aliased sampling→ aliased spectrum
FIG. 1
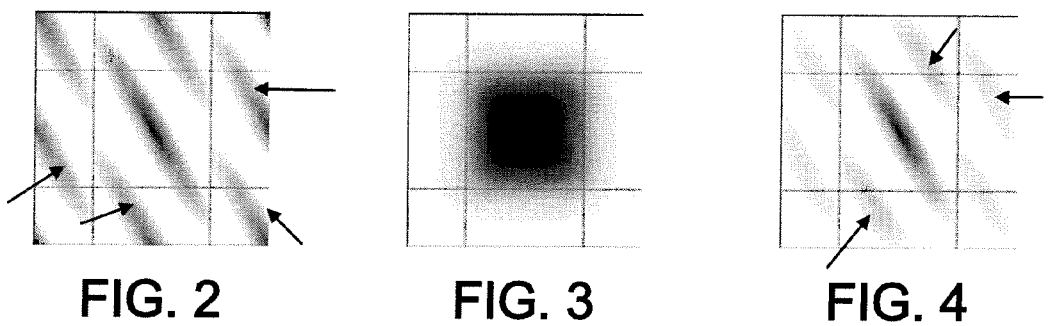
FIG. 2   FIG. 3   FIG. 4
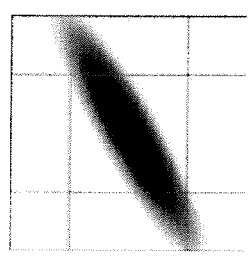   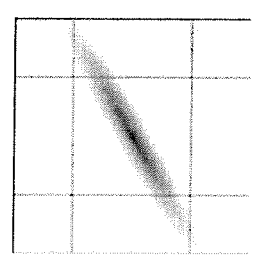
FIG. 5   FIG. 6

METHOD FOR DETECTING DIRECTIONS OF REGULARITY IN A TWO-DIMENSIONAL IMAGE

BACKGROUND OF THE INVENTION

The present invention relates generally to image scaling methods. Two-dimensional (2D) spatial scaling is more specifically addressed. In particular, the method is well suited to the processing of video sequences.

Upscaling a grayscale or color image is useful to display the image with a spatial resolution higher than the resolution of the image signal as received, for example for displaying a PAL or NTSC TV signal in a HDTV format. The upscaling operation, however, often leads to artifacts typical of scaling aliased images.

Upscaled edges have staircase effects (or "jaggies"), which have unnatural motion when such edges are moving in a video sequence. This is caused by aliasing, i.e. the frequency content of the original image has been folded by the sampling applied when acquiring or transforming the signal and the folded frequencies are not at appropriate locations in the 2D spectrum after upscaling. The generation process of an aliased image with an aliased spectrum is illustrated in FIG. 1. Ideally, an image portion (patch) containing an edge should have a relatively sharp spectrum as shown in the bottom left portion of the figure. But oftentimes, the sampling rate $f_s$ of the image portion is not sufficient to ensure presence at the right spectral locations of the high-frequency components of the signal. Instead, these high-frequency components are folded and appear at other spectral locations as shown in the bottom right portion of FIG. 1, which corresponds to the jaggy aspect of the edge in the subsampled image.

A standard way of upscaling an image is to apply an interpolation filter. This is illustrated in FIGS. 2-4. Depending on the aliasing of the subsampled image, aliased spectral contents can be at various locations (arrows in the spectrum of FIG. 2). In general, the filter, whose spectrum is typically as shown in FIG. 3, is not able to properly recover a high-resolution image without leaving some amount of aliased spectrum (arrows in FIG. 4 showing the aliased spectrum of the upscaled image).

On the other hand, if the subsampled image having an aliased spectrum is upscaled using a filter whose spectrum (FIG. 5) is directionally selective, the upscaled image (FIG. 6) has a spectrum much closer to that of the original image. It does not have any more aliased contents, and it keeps a more important part of the original high-frequency content.

Directional interpolation methods have been proposed, for example in US 2009/0028464 A1. Similar (yet different) problems are addressed in U.S. Pat. No. 6,614,484 in the field of deinterlacing. An interpolation method consists in providing a set of directional interpolation filters, and performing the interpolation by choosing for each pixel an interpolator depending on the local image content. The underlying idea is that it is better to use a directional interpolation filter that is aligned with a contour whenever the current pixel is on a contour within the image.

Existing solutions for directional interpolation are usually based on very simple 2-tap filters. The metrics used to select a particular directional interpolation are usually simple gradient or correlation metrics. Such solutions are still prone to visual artefacts such as blurring of sharp edge patterns and detailed texture patterns in the image, ringing along edge contours, as well as jaggedness along edge contours.

There is thus a need for improved image processing methods in the field of directional interpolation or 2D scaling.

SUMMARY OF THE INVENTION

A method for analyzing an image signal having pixel values defined on a sampling grid is proposed. The method comprises, for detecting at least one direction of regularity of the image signal in relation to a pixel of the sampling grid:

computing a respective loss value associated with at least one direction in a set of directions; and selecting at least one direction of regularity by minimizing the loss value.

The loss value associated with a direction (u, v), where u is a horizontal coordinate and v a vertical coordinate, has an axial loss component measuring variations of the pixel values in at least one linear array of pixels. This linear array is a horizontal array if $|u/v|>1$ and a vertical array if $|u/v|<1$.

The loss value including the axial loss components makes it possible to efficiently detect slanted directions of regularity, particularly the input image exhibits aliasing.

In accordance with an embodiment, for a pixel having respective integer spatial indices j and k along the horizontal and vertical directions, the axial loss component for a direction (u, v), where $|u/v|$ is a non-zero integer n, is a measure of variations of the pixel values in 2Q+1 horizontal arrays, where Q is a positive integer. The 2Q+1 horizontal arrays comprise, for each integer q such that $-Q \leq q \leq Q$, a horizontal array of $a_{q,n}+a_{-q,n}+1$ pixels including a pixel having respective integer spatial indices j+n.q and k+q along the horizontal and vertical directions, the numbers $a_{q,n}$ being positive integers. Likewise, the axial loss component for a direction (u, v), where $|v/u|$ is a non-zero integer m, can be a measure of variations of the pixel values in 2Q+1 vertical arrays. The 2Q+1 vertical arrays comprise, for each integer q such that $-Q \leq q \leq Q$, a vertical array of $a_{q,m}+a_{-q,m}+1$ pixels including a pixel having respective integer spatial indices j.q and k+m.q along the horizontal and vertical directions.

For q=0, each horizontal array of $2 \cdot a_{0,n}+1$ pixels and each vertical array of $2 \cdot a_{0,m}+1$ pixels are typically centered on the pixel having the respective integer spatial indices j and k along the horizontal and vertical directions. Advantageously, for each integer q such that $-Q \leq q \leq Q$, the positive integers $a_{q,n}$ are non-decreasing functions of $|n|$ and the positive integers $a_{q,m}$ are non-decreasing functions of $|m|$.

The method may further comprise filtering spatially the axial loss component using an averaging window.

Another aspect of the invention relates to an apparatus for implementing the above image analysis method. The apparatus comprises an optimizer for detecting at least one direction of regularity of the image signal in relation to a pixel of the sampling grid. The optimizer comprises processing resource for computing a respective loss value associated with at least one direction in a set of directions, and a selector for selecting at least one direction of regularity by minimizing the loss value. The processing resource comprises a metrics computation unit for computing an axial loss component of the loss value associated with a direction (u, v), where u is a horizontal coordinate and v a vertical coordinate. The axial loss component measures variations of the pixel values in at least one linear array of pixels, the linear array being a horizontal array if $|u/v|>1$ and a vertical array if $|u/v|<1$.

Other features and advantages of the method and apparatus disclosed herein will become apparent from the following description of non-limiting embodiments, with reference to the appended drawings.

BRIEF DESCRIPTION OF THE DRAWINGS

FIG. 1 is a diagram illustrating the aliasing phenomenon.

FIG. 2 shows the spectrum of an image signal before application of an upscaling operation.

FIGS. 3-4 show the spectrum of an isotropic interpolation filter and of the image signal of FIG. 2 upscaled using isotropic interpolation with the filter of FIG. 3.

FIGS. 5-6 show the spectrum of a directional interpolation filter and of the image signal of FIG. 2 upscaled using directional interpolation with the filter of FIG. 5.

DESCRIPTION OF EMBODIMENTS

Figure 7:
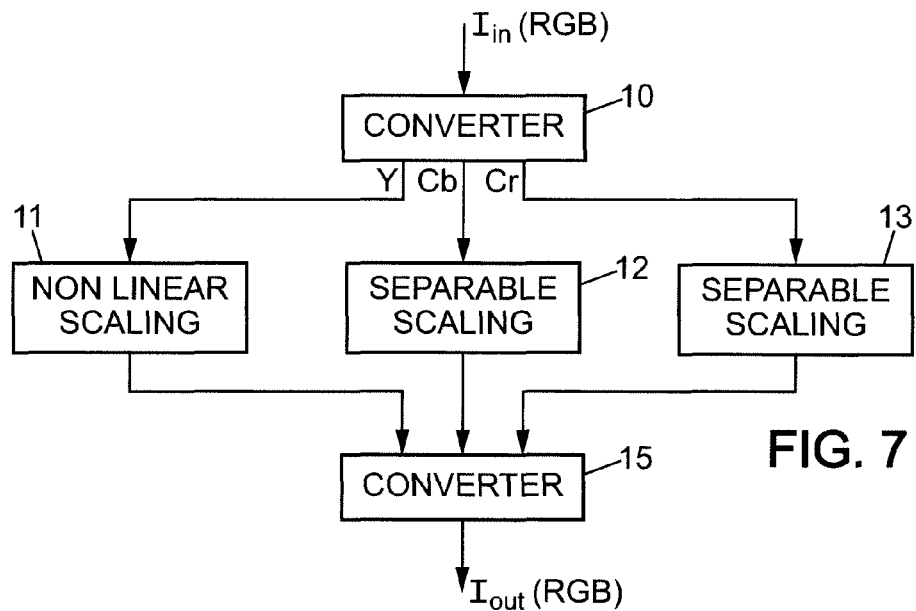
FIG. 7 is a block diagram of a video scaling apparatus implementing the invention.

The exemplary apparatus represented in FIG. 7 processes color images in three channels corresponding to the YCbCr coordinates. If the input image $I_{in}$ is available in another format, such as RGB, a converter 10 transforms it into the YCbCr coordinate system to provide the luminance component Y, the blue-difference chroma component Cb and the red-difference chroma component Cr.

In the embodiment of FIG. 7, each channel of the image color system undergoes a different upscaling processing with the same upscaling ratio. For instance, a nonlinear scaling operation is applied by a scaling unit 11 to the Y channel while a conventional separable scaling operation, for example using two-dimensional Lanczos filters, is applied to the two chroma channels Cb, Cr by scaling units 12, 13. The more sophisticated nonlinear scaling as described below is applied to the luminance channel because it is the most sensitive one for the viewer. It can also be applied to the chroma channels if enough computational power is available. In many instances, however, a simpler separable scaling will be used for the chroma channels to limit complexity of the circuitry.

It will be appreciated that the nonlinear scaling process can also be applied to other color components, such as red (R), green (G) and blue (B) components.

The nonlinear scaling for a single channel image consists in this embodiment in considering for each output pixel (either individually or group by group) a candidate set of interpolators corresponding to various directions of regularity of the image, and to select the best interpolator depending on associated regularity measures (see WO 2007/115583 A1).

If needed, the three upscaled channels Y, Cb, and Cr are converted back to the original RGB format by a converter 15 to provide an output image $I_{out}$.

A one-dimensional interpolation function is a function $\phi(.)$ verifying:

$\phi(0)=1$;

$\phi(j)=0$ for any integer j other than 0; and $$\sum_{j=-\infty}^{+\infty} \phi(s+j) = 1$$

for any real number s.

The convolution of such an interpolation function $\phi(.)$ with an input function having non-zero values for arguments that are integers (like a sequence of input pixels values) results in values that are the same as the input function for integer arguments, and interpolated values between them. The interpolation function $\phi(.)$ typically has a support $]-p, +p[$ centered on 0, whose size is 2p with p being a positive integer. The simplest interpolation function $\phi(.)$ has p=1 and for $-1<s<1$, $\phi(s)=1-|s|$. Other suitable interpolation functions $\phi(.)$ can be selected for their spectral properties. In particular, the number p can be greater than one, making it possible to use high-order filters such as Lanczos filters for example.

A source image (monochrome), such as the Y component in the block diagram of FIG. 7, is an array of values indexed by integer indices: I(j, k), defined for a range j=0, ..., J−1 and k=0, ..., K−1.

A separable (i.e. linear) upscaling of the image I consists in computing interpolated pixel values I(x, y) for non-integer x and y indices as:

$$I(x, y) = \sum_j \sum_k I(j, k).f(x-j).g(y-k) \quad (1)$$

where f and g are one-dimensional interpolation functions of finite support $]-p, +p[$. Here, x and y are non-integer points at which we want to interpolate the image, and j and k are integer indices. Because of this, only a finite (in practice small, at most 2p) number of terms are non-zero.

If the output grid of points x, y is regular, i.e. $x=x_0+a \times dx$ and $y=y_0+b \times dy$, where a and b are integer numbers (which is the case for most applications), the upscaling process can be performed in two steps: a vertical scaling using filter g to compute $I(j, y_0+b \times dy)$ for integers j and b, and an horizontal scaling using filter f to compute $I(x_0+a \times dx, y_0+b \times dy)$ for integers a and b. Depending on optimization opportunities in an implementation of such conventional separable upscaling, the horizontal scaling can be performed before the vertical scaling or the converse.

Figure 8:
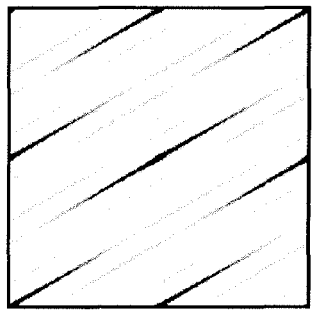
FIG. 8 shows the spectrum of another image signal before application of an upscaling operation.
Figure 9:
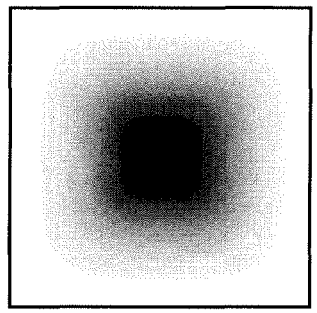
FIGS. 9-10 show the spectrum of an isotropic interpolation filter and of the image signal of FIG. 8 upscaled using isotropic interpolation with the filter of FIG. 9.
Figure 10:
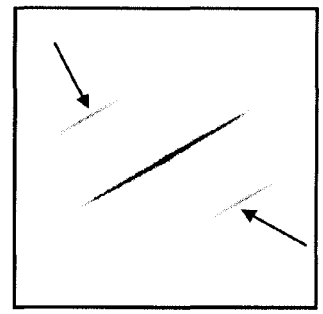

The spectral effect of such a separable upscaling method is illustrated in FIG. 8-10 which are similar to FIGS. 2-4. The local spectrum near an edge of the input image (FIG. 8) has a relatively sharp shape, at 90° with respect to the edge direction, with aliased components due to limitation in the sampling frequency. Processing by a separable filter, whose spectral shape is symmetrical as shown in FIG. 9, leaves some amount of aliased spectrum in the upscaled image, with secondary frequency modes shown by the arrows in FIG. 10.

Figure 11:
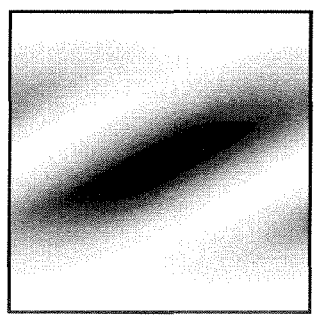
FIGS. 11-12 show the spectrum of a directional interpolation filter and of the image signal of FIG. 8 upscaled using directional interpolation with the filter of FIG. 11.
Figure 12:
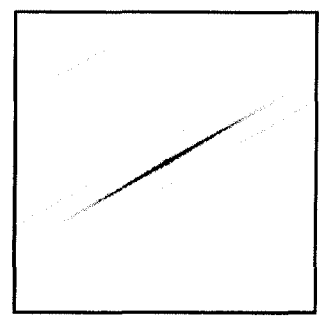

If we can use locally a different kind of 2D upscaling filter with a slanted spectrum as shown in FIG. 11, the same signal will be upscaled into a cleaner signal (FIG. 12) obtained by a better selection of the central lobe of the spectrum of the original image.

In the embodiment of FIG. 7, a separable upscaling method using Lanczos functions for f and g is applied in the chroma channels by the scaling units 12, 13. However, in the scaling unit 11 processing the luminance channel, the interpolation filters are built as slanted separable filters. The slant can be applied along the horizontal or the vertical axis. Starting from a conventional separable interpolation filter:

$$F(x,y) = f(x) \cdot g(y) \quad (2)$$

where f and g are 1D interpolation functions having finite supports, applying a slant of n along the horizontal (x) axis consists in replacing F(x, y) by:

$$G_n(x,y) = F(x-ny, y) = f(x-ny) \cdot g(y) \quad (3)$$

where n is a slant parameter such that $|n| > 1$. The resulting filter is oriented along the direction $D_n = (n, 1)$ in the spatial domain, closer to the horizontal axis than the vertical axis since $|n| > 1$. Convolving an array of input pixels I(j, k) by the interpolation function $G_n(x, y)$ yields, instead of (1), an interpolated image signal:

$$I_n(x, y) = \sum_j \sum_k I(j, k) \cdot f(x - j - n(y - k)) \cdot g(y - k) \quad (4)$$

Likewise, to obtain filters oriented along direction $D'_m = (1, m)$ in the spatial domain with $|m| > 1$, i.e. closer to the vertical axis than the horizontal axis, a slant of m is applied along the vertical (y) axis by replacing F(x, y) by:

$$H_m(x,y) = F(x, y-mx) = f(x) \cdot g(y-mx) \quad (5)$$

Convolving the array of input pixels I(j, k) by the interpolation function $H_m(x, y)$ yields, instead of (1), an interpolated image signal:

$$I'_m(x, y) = \sum_j \sum_k I(j, k) \cdot f(x - j) \cdot g(y - k - m(x - j)) \quad (6)$$

The values of the slant parameters n, m can be integer or non-integer, positive or negative. At least some of them need to be of absolute value larger than 1. Choosing only integer values makes the implementation simpler.

The f and g functions can be Lanczos filters, for example. They can be identical or they can be filters of different sizes and/or shapes. Their support ]−p; p[ need not be the same. Good performance is obtained if, for at least one of f and g, in particular for f, the support ]−p; p[ is larger than ]−1; 1[.

The set of filters which can be used locally for upscaling consists of two subsets. One subset of filters constructed by slanting along the horizontal direction (with slant parameters n), and one subset of filters constructed by slanting along the vertical direction (with slant parameters m). For each of the subsets, filters are constructed using a family of slant parameter.

For example, we can construct a set of filters using always the same filter for both f and g: a Lanczos-4 interpolation filter (p=4). For the first subset (interpolators $I_n$ slanted toward the horizontal direction), slanting parameters n such as −N, −N+1, ..., −1, 0, +1, ..., +N are used, where N is some integer. Other sets of slant parameters can used, integer or non integer, regularly spaced or not. For the second subset (interpolators $I'_m$ slanted toward the vertical direction), parameters m such as −M, −M+1, ..., −1, 0, +1, ..., +M are used, where M is some integer. The numbers M and N need not be identical. In particular, the value of N can be larger than that of M, in order to contain the vertical span of the processing, and thus the line buffer size necessary to realize the interpolation in an integrated circuit. If the values of the parameters m and n are not all integers, it is however necessary, to preserve good anti-aliasing properties, that whenever they are non-zero their absolute value is not less than 1.

The inclusion of non-slanted interpolation functions (with a 0 parameter) is motivated by the fact that the corresponding interpolators are standard separable interpolation functions. They are used as fallback interpolators in cases where a suitable direction of regularity cannot be detected.

One interesting aspect of the above-mentioned filters $I_n$ and $I_m$ is that the resulting interpolation process is of same complexity as a separable interpolation process, even though the filters are not actually separable, i.e. cannot be written as a product $f(x) \cdot g(y)$.

The interpolation process for a given spatial direction of regularity D=(u, v) at a location x, y consists in computing I(x, y) where x and y are not both integers using values of I(j, k) for integer values of j and k only. Three cases are considered:

(i) if u=0 or v=0, a standard separable interpolation process is used (sequence of horizontal then vertical scaling or the converse);

(ii) if $|u| \geq |v|$, the direction (u, v) is parallel to the direction $D_{u/v} = (u/v, 1)$, and $|u/v| \geq 1$. In this case, the interpolation is performed using the slanted filter $G_n(x, y)$ where n=u/v. This can be done by interpolating first along the horizontal direction and then along the vertical direction. The horizontal interpolation consists in using the interpolation function f to compute estimated pixel values $I_{H,n}(x, y, k)$ at positions $(x'_k, k) = (x-n(y-k), k)$, where the vertical position index k is an integer and the horizontal position index $x'_k = x-n(y-k)$ is generally not an integer, namely:

$$I_{H,n}(x, y, k) = \sum_j I(j, k) \cdot f(x - n.(y - k) - j) \quad (7)$$

The vertical interpolation then consists in using the interpolation function g to derive the interpolated pixel value $I_n(x, y)$ at the position (x, y), namely:

$$I_n(x, y) = \sum_k I_{H,n}(x, y, k) \cdot g(y - k) \quad (8)$$

(iii) if $|u| < |v|$, the direction (u, v) is parallel to the direction $D'_{v/u} = (1, v/u)$, and $|v/u| > 1$. The interpolation is performed using the slanted filter $H_m(x, y)$ where m=v/u. This can be done by interpolating first along the vertical direction and then along the horizontal direction. The vertical interpolation consists in using the interpolation function g to compute estimated pixel values $I_{V,m}(x, y, j)$ at positions $(j, y'_j) = (j, y-m(x-j))$, where the horizontal position index j is an integer and the vertical position index $y'_j = y-m(x-j)$ is generally not an integer, namely:

$$I_{V,m}(x, y, j) = \sum_k I(j, k) \cdot g(y - m.(x - j) - k) \quad (9)$$

The horizontal interpolation then consists in using the interpolation function f to derive the interpolated pixel value $I'_m(x, y)$ at the position (x, y), namely:

$$I'_m(x, y) = \sum_j I_{V,m}(x, y, j).f(x - j) \quad (10)$$

The interpolation process is particularly simple to implement when the upscaling ratio is constrained to be a factor of 2 in each direction (or an integer factor in {1, 2} in each direction, the scaling factor along x and y being chosen differently). If the considered directions of regularity are all of the form (n, 1) or (1, m) with integer values of n and m, interim horizontal or vertical interpolations as well as final interpolation only need to be done on a half-integer grid. This simplifies the architecture to a large extent.

In an embodiment, when an arbitrary scaling factor is required (scaling factor different from 1 and 2 in at least one of the two dimensions), part of the upscaling process is done using the above-mentioned upscaling stage, and the remaining of the scaling is done with a traditional scaler. This may be referred to as "split-scaling". For example, to convert images of 720×576 pixels into high-definition images of 1920×1080 pixels, e.g. from PAL to 1080p, a 2D directional interpolation is first applied to scale the image by a factor of 2 using the above-described interpolators $I_n(x, y)$ and $I'_m(x, y)$, to get an image of size 1440×1152, and the resulting image is then scaled by a factor of 1920/1140=1.333 along the horizontal dimension and by a factor of 1080/1152=0.9375 along the vertical dimension. The second scaling stage with ratios 1.333 and 0.9375 can be implemented using conventional separable 2D interpolation filters.

Figure 13:
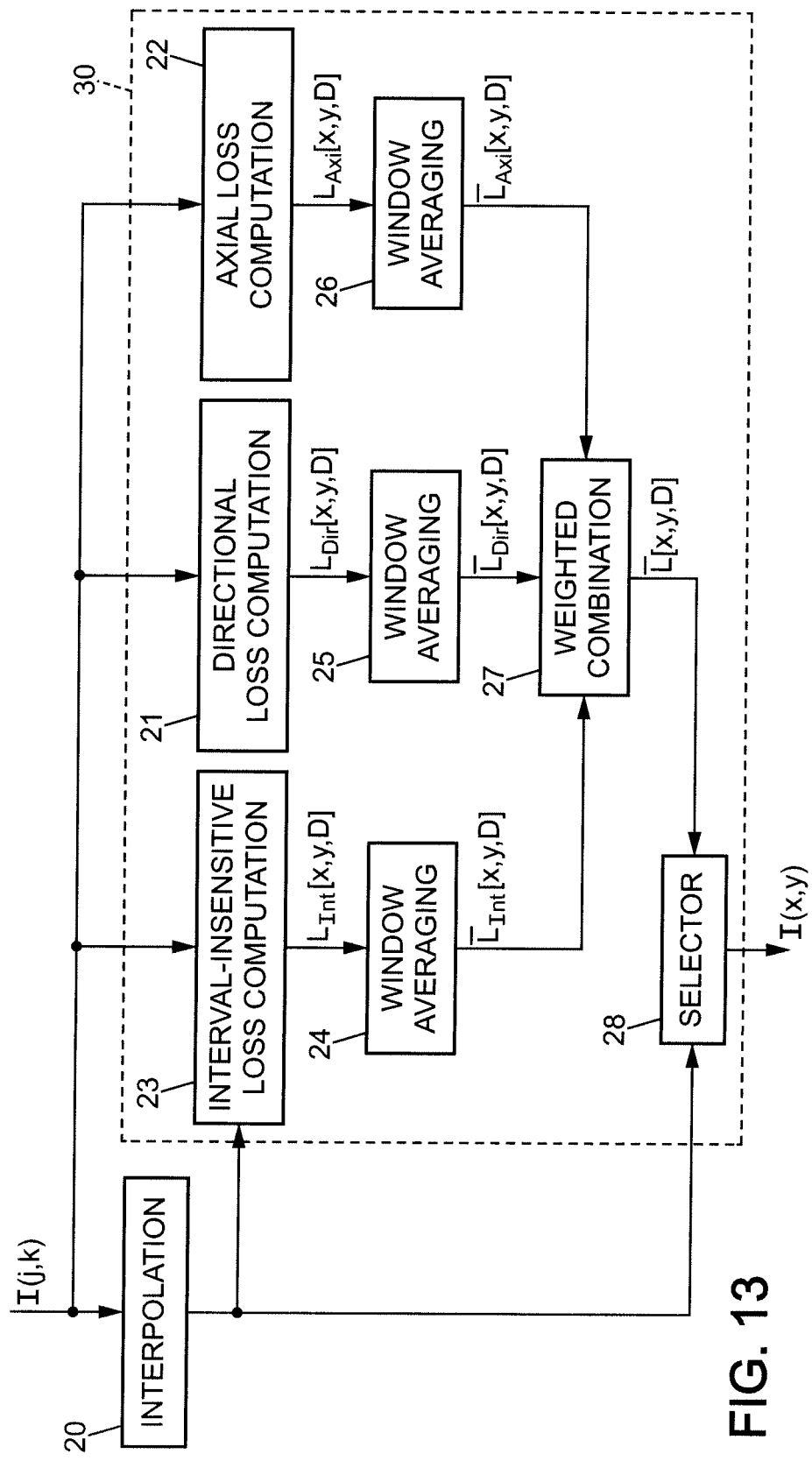
FIG. 13 is a block diagram of an exemplary nonlinear scaling unit.

FIG. 13 illustrates a possible architecture of the nonlinear scaling unit 11 of FIG. 7. The incoming image signal is noted I(j, k) here even though, as mentioned above, it may consist only of the luminance component Y of the input signal $I_{in}(j, k)$. It is defined on an input sampling grid spatially indexed by integers j, k. An interpolation processor 20 calculates interpolated pixel values for the points x, y of the output sampling grid. At least some of these output points have non-integer spatial indices x, y and thus do not belong to the input sampling grid. The interpolation processor 20 may apply the slanted interpolators $I_n$, $I_m$ defined above. An optimizer 30 comprising three metrics computation units 21, 22, 23 and a selector 28 evaluates the candidate directions of regularity $D_n$, $D'_m$ for each point of the output grid to provide the corresponding output pixel value using one or more of the interpolated pixel values.

The metrics computation units 21, 22, 23 compute three components of loss values respectively associated with the pixels x, y of the output image and with respective candidate directions D. It will be appreciated that other types of metrics components or other combinations of such components can be considered when implementing a scaling apparatus using the interpolators $I_n$, $I'_m$ described above. It will further be appreciated that the structure of the metrics, in particular with the axial loss component computed by unit 22, is usable with directional interpolators other than those disclosed above.

The components computed by the metrics computation units 21, 22, respectively called directional loss and axial loss, do not require prior computation of the interpolated pixel values.

The directional loss $L_{Dir}[x, y, D]$ for a direction D at a pixel position x, y is simply a measure of the local gradient of the input image signal along that direction D. By way of example, in the case of an upscaling factor of 2 in both the horizontal and vertical dimensions, each input pixel (j, k) has four corresponding output pixels (x, y)=(j+ε/2, k+ε'/2) where ε and ε' are in {0, 1}, and for each candidate direction D, the same directional loss value $L_{Dir}[x, y, D]$ is taken for each of the four associated output pixels as: $L_{Dir}[x, y, D_n]=|I(j+n, k+1)-I(j-n, k-1)|$ and $L_{Dir}[x, y, D'_m]=|I(j+1, k+m)-I(j-1, k-m)|$. Other expressions of the gradient can be considered.

A refinement consists in adding to the directional loss component $L_{Dir}[x, y, D]$ another component called the interval insensitive loss $L_{Int}[x, y, D]$ computed by the metrics computation unit 23. This interval-insensitive loss is computed using the candidate interpolated values, obtained by the interpolation processor 20, whose likelihood compared to the pixel's neighborhood in the input image is evaluated using insensitivity intervals as described in detail in WO 2007/115583.

The directional loss $L_{Dir}[x, y, D]$ computed by the metrics computation unit 21, the axial loss $L_{Axi}[x, y, D]$ computed by the metrics computation unit 22 and the interval-insensitive loss $L_{Int}[x, y, D]$ computed by the metrics computation unit 23 can be filtered spatially using respective averaging windows in the averaging units 24, 25 and 26. A window average for a value L[x, y, D] can be defined as $$\bar{L}[x, y, D] = \sum_\alpha \sum_\beta W(\alpha, \beta).L[x + \alpha, y + \beta, D]$$

where W(α,β) is an averaging window of finite (usually small) support.

The averaged loss components $\bar{L}_{Dir}[x, y, D], \bar{L}_{Axi}[x, y, D], \bar{L}_{Int}[x, y, D]$ for each output pixel and each candidate direction D are then combined by the combination unit 27 to provide the combined loss $\bar{L}[x, y, D]$. The combination in the unit 27 is typically a weighted sum of the three averaged loss components, possibly with different weights. The averaging window W(α,β) can be different for each loss component. It can also be the same window, in which case the three components can be combined prior to filtering in a single averaging unit.

In the above example where the upscaling ratio is 2 in both directions, a loss value $\bar{L}[j, k, D]$ is computed for each input pixel (j, k), and is associated to each of the four corresponding output pixels (x, y): $\bar{L}[x, y, D]=\bar{L}[j, k, D]$ for (x, y)=(j+ε/2, k+ε'/2) with ε and ε' in {0, 1}. It is also possible, though more computationally complex, to compute a loss value individually for each output pixel.

For each output pixel (x, y), the selector 28 determines the candidate direction D for which the loss value $\bar{L}[x, y, D]$ is minimum. The interpolated pixel value $I_n(x, y)$ or $I'_m(x, y)$ which was determined by the interpolation processor 20 for that direction D is then output as the scaled pixel value I(x, y) at position (x, y).

It is also possible that the selector 28 identifies a predefined number of directions D for which the loss value $\bar{L}[x, y, D]$ is minimum, and mixes the interpolated pixel values provided by from the interpolation processor 20 for these directions.

The axial loss value for a direction D=(u, v) measures variations of the input pixel values in one or several linear arrays of pixels which extend horizontally |u/v|>1 and vertically if |u/v|<1.

Figure 14:
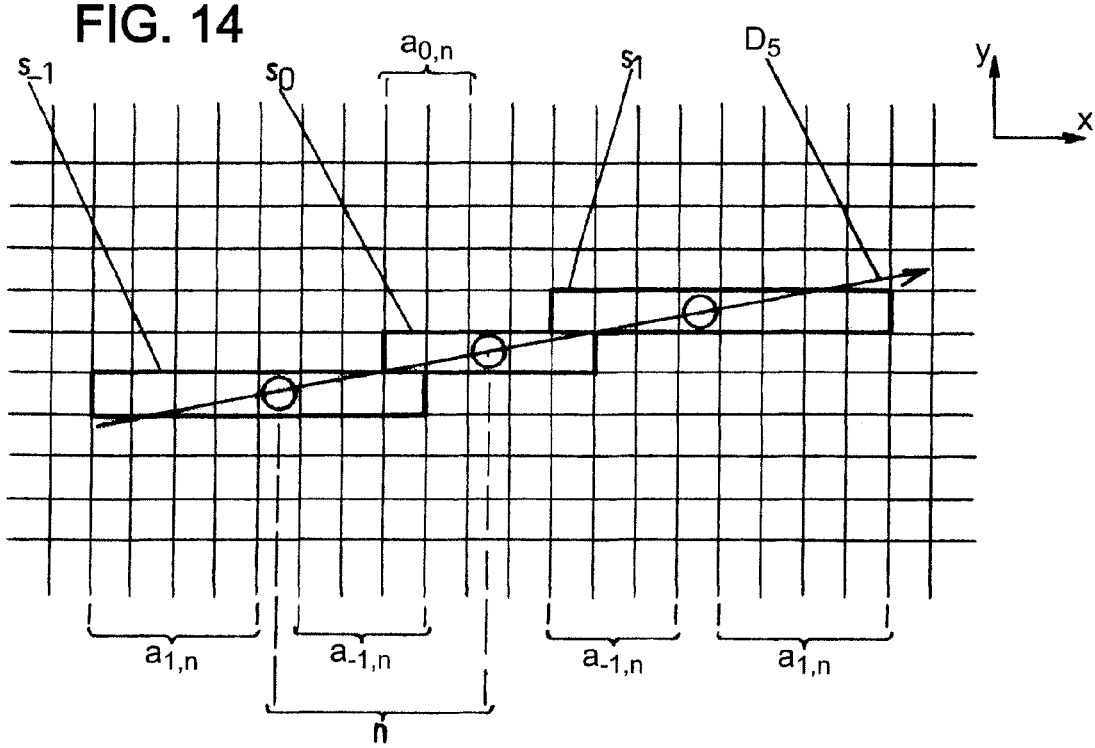
FIGS. 14-15 illustrate the computation of an axial loss component in an embodiment of the invention.
Figure 15:
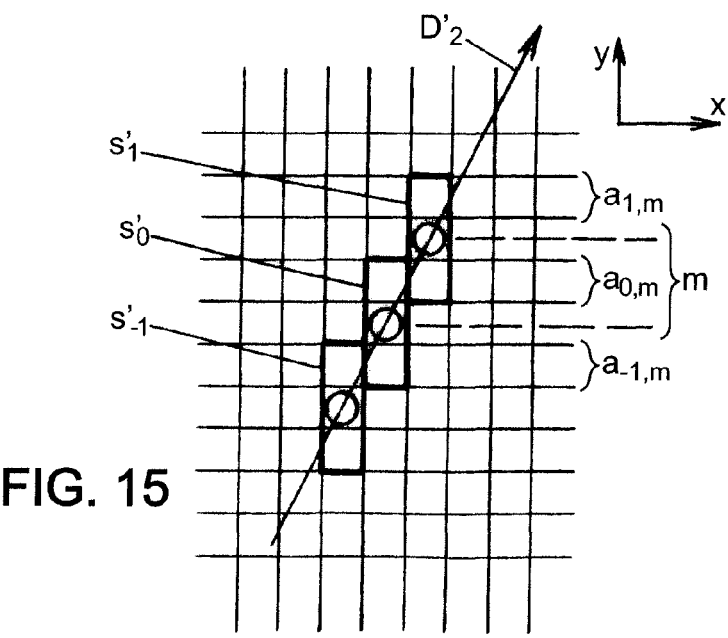

FIGS. 14-15 illustrate examples of construction of two sets of arrays for calculation of axial loss values. In FIG. 14, the arrays $s_0$, $s_{-1}$, $s_{+1}$ are for a direction $D_5=(5, 1)$ closer to the horizontal axis than to the vertical axis (u/v=n=5>1). In FIG. 15, the arrays $s'_0$, $s'_{-1}$, $s'_{+1}$ are for a direction $D'_2=(1, 2)$ closer to the vertical axis than to the horizontal axis (u/v=1/m=1/2<1). The examples given use sets of three vertical or horizontal arrays to compute an axial loss value, a good compromise between implementation cost and reliability of the axial loss values. It will be appreciated that, in other embodiments, the axial loss can be computed with more or fewer arrays.

For a linear array s of p samples, $s=[s(1), s(2), \ldots, s(p)]$, a variation energy $E(s)$ is considered for measuring the variation of the p values $s(1), s(2), \ldots, s(p)$ of the array. The variation energy $E(s)$ can have different expressions, for example:

$$E(s) = \sum_{k=1}^{p-1} |s(k+1) - s(k)| \quad (11)$$

or:

$$E(s) = \sum_{k=1}^{p-1} |s(k+1) - s(k)|^2 \quad (12)$$

or else:

$$E(s) = \sum_{k=1}^{p-2} |s(k+2) - 2 \cdot s(k+1) + s(k)| \quad (13)$$

In an embodiment, the axial loss $L_{Axi}[j, k, D_n]$ for a direction $D_n=(n, 1)$ (n>1) at a pixel position (j, k) of the input grid is a sum of variation energies $E_0=E(s_0)$, $E_{-1}=E(s_{-1})$ and $E_1=E(s_1)$, computed for three horizontal arrays $s_0$, $s_{-1}$ and $s_1$, i.e. $L_{Axi}[j, k, D_n]=E_0+E_{-1}+E_1$. The first horizontal array $s_0$ has $2 \cdot a_{0,n}+1$ pixels at the vertical position of the pixel being considered:

$$s_0 \lfloor I(j-a_{0,n},k), I(j-a_{0,n}+1,k), \ldots, I(j,k), \ldots, I(j+a_{0,n},k) \rfloor \quad (14)$$

The second horizontal array has $s_{-1}$ has $a_{-1,n}+a_{1,n}+1$ pixels at the vertical position just below and shifted horizontally by −n pixel positions to account for the slant of the interpolator $I_n$:

$$s_{-1}=\lfloor I(j-n-a_{-1,n},k-1), I(j-n-a_{-1,n}+1,k-1), \ldots, I(j-n, k-1), \ldots, I(j-n+a_{1,n},k-1) \rfloor \quad (15)$$

Symmetrically, the third horizontal array $s_1$ has $a_{-1,n}+a_{1,n}+1$ pixels at the vertical position just above and shifted horizontally by +n pixel positions:

$$s_1=\lfloor I(j+n-a_{1,n},k+1), I(j+n-a_{1,n}+1,k+1), \ldots, I(j+n,k+1), \ldots, I(j+n+a_{-1,n},k+1) \rfloor \quad (16)$$

In this embodiment, the axial loss $L_{Axi}[j, k, D'_m]$ for a direction $D'_m=(1, m)$ (m>1) at the pixel position (j, k) is also a sum of three variation energies $E'_0=E(s'_0)$, $E'_{-1}=E(s'_{-1})$ and $E'_1=E(s'_1)$, computed for three vertical arrays $s'_0$, $s'_{-1}$ and $s'_1$, i.e. $L_{Axi}[j, k, D'_m]=E'_0+E'_{-1}+E'_1$. The first vertical array $s'_0$ has $2 \cdot a_{0,n}+1$ pixels at the horizontal position of the pixel being considered:

$$s'_0 \lfloor I(j,k-a_{0,m}), I(j,k-a_{0,m}+1), \ldots, I(j,k), \ldots, I(j,k+a_{0,m}) \rfloor \quad (17)$$

The second vertical array $s'_{-1}$ has $a_{-1,n}+a_{1,n}+1$ pixels at the horizontal position just left and shifted vertically by −m pixel positions to account for the slant of the interpolator $I'_m$:

$$s'_{-1}=\lfloor I(j-1,k-m-a_{-1,m}), I(j-1,k-m-a_{-1,m}+1), \ldots, I(j-1,k-m), \ldots, I(j-1,k-m+a_{1,m}) \rfloor \quad (18)$$

Symmetrically, the third vertical array $s'_1$ has $a_{-1,n}+a_{1,n}+1$ pixels at the horizontal position just right and shifted horizontally by +m pixel positions:

$$s'_1=\lfloor I(j+1,k+m-a_{1,m}), I(j+1,k+m-a_{1,m}+1), \ldots, I(j+1,k+m), \ldots, I(j+1,k+m+a_{-1,m}) \rfloor \quad (19)$$

The lengths of the three arrays $s_0$, $s_{-1}$, $s_1$ or $s'_0$, $s'_{-1}$, $s'_1$ are given by the three positive integer values $a_{-1,r}$, $a_{0,r}$, $a_{1,r}$ where r=n for a direction $D_n$ and r=m for a direction $D'_m$. Preferably, the integers $a_{-1,r}$, $a_{0,r}$, $a_{1,r}$ are increasing, or at least non-decreasing functions of |r|. Thus, relatively long arrays are used for directions close to the horizontal or vertical axis (|n| or |m| large) while shorter arrays are used for directions closer to ±45°.

In the illustrative example of FIGS. 14-15, the array length parameters are set as $a_{-1,5}=4$, $a_{0,5}=2$, $a_{1,5}=3$, $a_{-1,2}=a_{0,2}=a_{1,2}=1$.

The arrays used for computing the axial loss can, more generally, be in a number 2Q+1, where Q is a positive integer. Then, for a given pixel a the integer position (j, k), the axial loss component L[j, k, D] for a direction D=(u, v), with $|u/v|=n \neq 0$ or $|v/u|=m \neq 0$, is a measure of variations of the pixel values in the 2Q+1 arrays $s_q$ or $s'_q$. For $D=D_n$, the 2Q+1 arrays $s_q$ are horizontal and comprise, for each integer q in the range $-Q \leq q \leq Q$, a horizontal array of $a_{q,n}+a_{-q,n}+1$ pixels including the pixel at position (j+n.q, k+q). For $D=D'_m$, the 2Q+1 arrays $s'_q$ are vertical and comprise, for each integer q in the range $-Q \leq q \leq Q$, a vertical array of $a_{q,m}+a_{-q,m}+1$ pixels including the pixel at position (j.q, k+m.q). The numbers $a_{q,n}$ are positive integers which are advantageously non-decreasing functions of |n| (the positive integers $a_{q,m}$ being likewise non-decreasing functions of |m|). For q=0, the linear array is centered on the pixel (j, k), while for q≠0, there can be some asymmetry ($a_{-q,n} \neq a_{q,n}$ and/or $a_{-q,m} \neq a_{q,m}$) as shown in FIG. 14.

Figure 16:
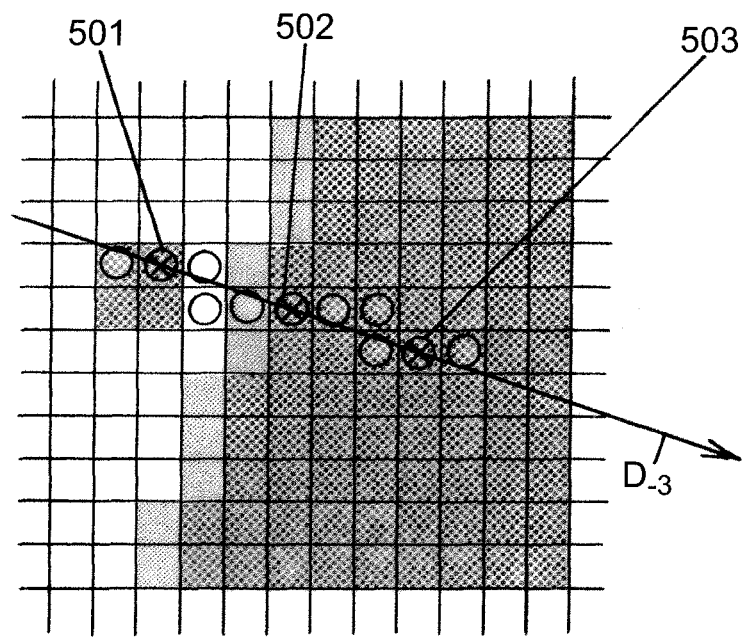
FIGS. 16-17 illustrate the computation of directional and axial loss components from an input mage for two different candidate directions.
Figure 17:
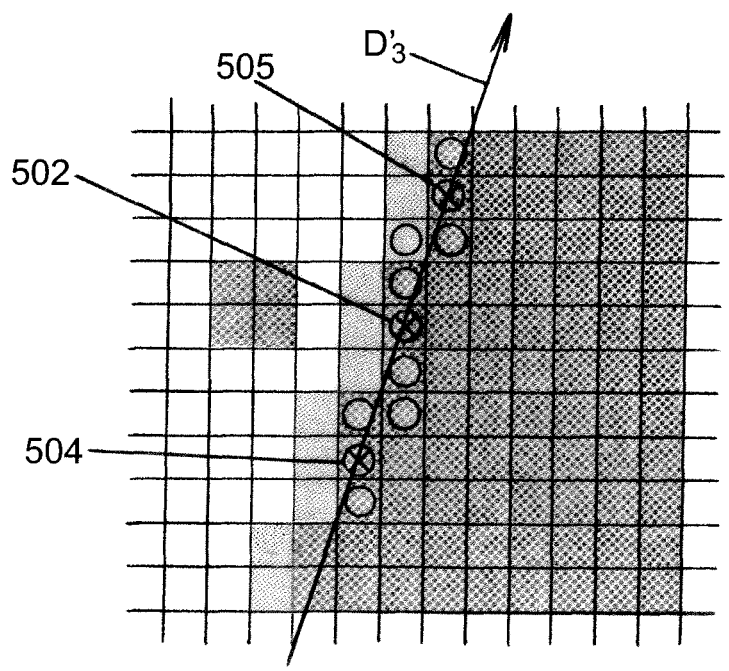

FIGS. 16-17 illustrate a situation in which the axial loss component of the loss value avoids wrong identification of a direction of regularity when the input image has some aliasing. In both figures, the input image is the same. For the sake of the present explanation, the darkest pixels are assumed to have a value I(j, k)=+1, the lightest pixels a value I(j, k)=0 and the medium dark pixels, possibly due to aliasing, a value I(j, k)=+0.5. In this aliased input image, we can distinguish an edge along the direction $D'_3$ and four dark pixels on the light side of the edge. FIG. 16 shows the direction $D_{-3}$ which competes with the preferable direction of regularity $D'_3$ shown in FIG. 17.

The directional loss value for pixel 502 and direction $D_{-3}$ is for example $L_{Dir}[502, D_{-3}]=|I(501)-I(503)|=0$, where I(501) is the image value at pixel 501 located one row above and three columns left of pixel 502 in the input grid and I(503) is the image value at pixel 503 located one row above and three columns right of pixel 502 (FIG. 16). Likewise, the directional loss value for pixel 502 and direction $D'_3$ can be $L_{Dir}[502, D'_3]=|I(504)-I(505)|=0$, where I(504) is the image value at pixel 504 located one column left and three columns below pixel 502 in the input grid and I(505) is the image value at pixel 505 located one column right and three rows above pixel 502 (FIG. 17). Both directional losses $L_{Dir}[502, D_{-3}]$ and $L_{Dir}[502, D'_3]$ are zero, all pixels 501-505 having the same pixel value in the example. Thus, a criterion for selecting the direction of regularity based solely on computation of the directional loss $L_{Dir}[x, y, D]$ may be fooled in a number of cases, a wrong direction $D_{-3}$ having the same probability as the right direction $D'_3$ of being selected (or even sometimes a higher probability). This problem is not always overcome by adding an interval-insensitive loss component $L_{int}[x, y, D]$. It is particularly encountered when upscaling aliased images.

The axial loss component $L_{Axi}[x, y, D]$, for example computed with three linear arrays as described above, is useful to overcome artifacts due to such errors in the detection of the direction of regularity. With a variation energy computed using equation (11) and $a_3=2$, $b_3=c_3=1$ as shown by the circles in FIGS. 16-17, the axial loss components for pixel 502 are:

$$L_{Axi}[502, D_{-3}]=E_0+E_{-1}+E_{+1}=(0.5+0.5+0+0)+(0+0)+(0+1)=2,$$

and $$L_{Axi}[502, D'_3]=E'_0+E'_{-1}+E'_{+1}=(0+0+0+0.5)+(0+0)+(0+0)=0.5.$$

The axial loss component for the right direction $D'_3$ is significantly smaller than that for the wrong direction $D_{-3}$ in this example. It will make it possible for the selector 28 to make the good decision for the interpolation to be retained. It is observed that interpolating along $D_{-3}$ would give a very poor result in this case, which is not an uncommon case in real images having edges between objects.

The above-described methods of analyzing an image signal for detecting directions of regularity and of scaling the image can be implemented using different hardware platforms. They are applicable, in particular, to process video signals in application-specific integrated circuits (ASIC) or field-programmable gate arrays (FPGA). Use of a general-purpose computer running appropriate programs is also possible.

Figure 18:
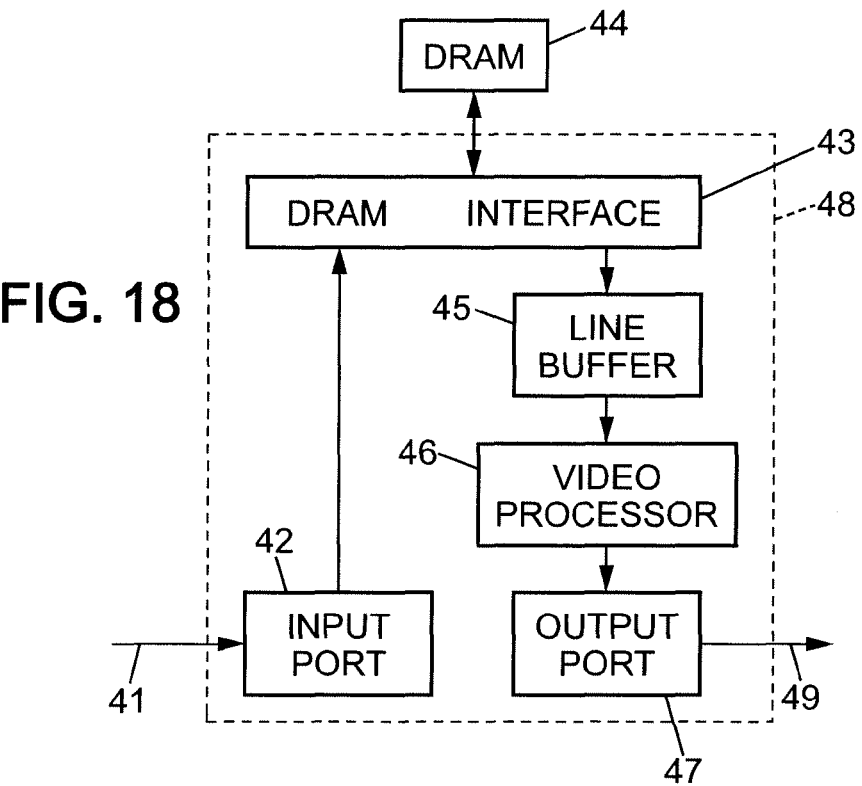
FIG. 18 is a block diagram of a video processing apparatus which may implement the invention.

FIG. 18 shows the overall architecture of an exemplary processing device 48 which may be used to implement such methods when the input images are frames of a video signal. The input pixels 41 received at an input port 42 are stored into a frame buffer 44, typically implemented as one or more external dynamic random access memory (DRAM) chips, via a DRAM interface 43. Then, a video processor 46 fetches lines from the DRAM 44 through the DRAM interface 43, storing them temporarily in a line buffer 45. The output 49 of processor 46 is fed to the output port 47 to be transmitted to the next device to which the video processing device 48 is connected. All image transfers are typically done in raster order, i.e. each frame full line by full line, and each line of a frame pixel by pixel from left to right. The processor 46 runs software written in a suitable language as commonly used in the art, to implement digitally the above-described processing methods. Architectures as described in WO 2010/091930 A2 can also be used. It will be noted that since the present methods relate to 2D interpolation, an external frame buffer is not a requirement.

In this kind of architecture, the size of the internal line buffer 45 is an important factor in terms of hardware complexity and cost. When optimizing the nonlinear scaling process, some parameters can be adjusted to limit the increase of the internal line buffer 45. For example, the one-dimensional interpolation function f used along the horizontal direction to construct the slanted interpolators can have a larger support than the one-dimensional interpolation function g used along the vertical direction. If only one of f and g has a support ]−p; p[ with p>1, it should thus preferably be g. Also, the range of values for the parameter n can be broader than that for the parameter m as mentioned above.

It will be appreciated that the embodiments described above are illustrative of the invention disclosed herein and that various modifications can be made without departing from the scope as defined in the appended claims.

The invention claimed is:

1. A method for analyzing an image signal having pixel values defined on a sampling grid, the method comprising, for detecting at least one direction of regularity of the image signal in relation to a pixel of the sampling grid:
   computing a respective loss value associated with at least one direction in a set of directions; and
   selecting at least one direction of regularity by minimizing the loss value,
   wherein the loss value associated with a direction (u, v), where u is a horizontal coordinate and v a vertical coordinate, has an axial loss component measuring variations of the pixel values in at least one linear array of pixels, said linear array being a horizontal array if $|u/v|>1$ and a vertical array if $|u/v|<1$.

2. The method of claim 1, wherein, for a pixel having respective integer spatial indices j and k along the horizontal and vertical directions:
   the axial loss component for a direction (u, v), where $|u/v|$ is a non-zero integer n, is a measure of variations of the pixel values in 2Q+1 horizontal arrays, where Q is a positive integer, wherein the 2Q+1 horizontal arrays comprise, for each integer q such that $-Q \leq q \leq Q$, a horizontal array of $a_{q,n}+a_{-q,n}+1$ pixels including a pixel having respective integer spatial indices j+n·q and k+q along the horizontal and vertical directions, the numbers $a_{q,n}$ being positive integers;
   and the axial loss component for a direction (u, v), where $|v/u|$ is a non-zero integer m, is a measure of variations of the pixel values in 2Q+1 vertical arrays, wherein the 2Q+1 vertical arrays comprise, for each integer q such that $-Q \leq q \leq Q$, a vertical array of $a_{q,m}+a_{-q,m}+1$ pixels including a pixel having respective integer spatial indices j·q and k+m·q along the horizontal and vertical directions.

3. The method of claim 2, wherein for q=0, each horizontal array of $2 \cdot a_{0,n}+1$ pixels and each vertical array of $2 \cdot a_{0,m}+1$ pixels are centered on said pixel having respective integer spatial indices j and k along the horizontal and vertical directions.

4. The method of claim 2, wherein, for each integer q such that $-Q \leq q \leq Q$, the positive integers $a_{q,n}$ are non-decreasing functions of $|n|$ and the positive integers $a_{q,m}$ are non-decreasing functions of $|m|$.

5. The method of claim 1, further comprising filtering spatially the axial loss component using an averaging window.

6. An apparatus for analyzing an image signal having pixel values defined on a sampling grid, the apparatus comprising an optimizer (30) for detecting at least one direction of regularity of the image signal in relation to a pixel of the sampling grid, the optimizer comprising:
   a processing resource for computing a respective loss value associated with at least one direction in a set of directions; and
   a selector for selecting at least one direction of regularity by minimizing the loss value,
   wherein the processing resource comprises a metrics computation unit for computing an axial loss component of the loss value associated with a direction (u, v), where u is a horizontal coordinate and v a vertical coordinate, the axial loss component measuring variations of the pixel values in at least one linear array of pixels, the linear array being a horizontal array if $|u/v|>1$ and a vertical array if $|u/v|<1$.

7. The apparatus of claim 6, wherein, for a pixel having respective integer spatial indices j and k along the horizontal and vertical directions:
   the axial loss component for a direction (u, v), where $|u/v|$ is a non-zero integer n, is a measure of variations of the pixel values in 2Q+1 horizontal arrays, where Q is a positive integer, wherein the 2Q+1 horizontal arrays comprise, for each integer q such that $-Q \leq q \leq Q$, a horizontal array of $a_{q,n}+a_{-q,n}+1$ pixels including a pixel having respective integer spatial indices j+n·q and k+q along the horizontal and vertical directions, the numbers $a_{q,n}$ being positive integers;
   and the axial loss component for a direction (u, v), where $|v/u|$ is a non-zero integer m, is a measure of variations of the pixel values in 2Q+1 vertical arrays, wherein the 2Q+1 vertical arrays comprise, for each integer q such that $-Q \leq q \leq Q$, a vertical array of $a_{q,m}+a_{-q,m}+1$ pixels including a pixel having respective integer spatial indices j·q and k+m·q along the horizontal and vertical directions.

8. The apparatus of claim 7, wherein for q=0, each horizontal array of $2 \cdot a_{0,n}+1$ pixels and each vertical array of $2 \cdot a_{0,m}+1$ pixels are centered on said pixel having respective integer spatial indices j and k along the horizontal and vertical directions.

9. The apparatus of claim 7, wherein, for each integer q such that $-Q \leq q \leq Q$, the positive integers $a_{q,n}$ are non-decreasing functions of $|n|$ and the positive integers $a_{q,m}$ are non-decreasing functions of $|m|$.

10. The apparatus of claim 6, wherein the processing resource further comprise a filter for filtering spatially the axial loss component using an averaging window.

\* \* \* \* \*